(12) United States Patent
Hinton et al.

(10) Patent No.: US 11,494,609 B2
(45) Date of Patent: Nov. 8, 2022

(54) CAPSULE NEURAL NETWORKS

(71) Applicant: Google LLC, Mountain View, CA (US)

(72) Inventors: Geoffrey E. Hinton, Toronto (CA); Nicholas Myles Wisener Frosst, Toronto (CA); Sara Sabour Rouh Aghdam, Toronto (CA)

(73) Assignee: Google LLC, Mountain View, CA (US)

( * ) Notice: Subject to any disclaimer, the term of this patent is extended or adjusted under 35 U.S.C. 154(b) by 380 days.

(21) Appl. No.: 16/652,536

(22) PCT Filed: Dec. 15, 2017

(86) PCT No.: PCT/US2017/066771
§ 371 (c)(1),
(2) Date: Mar. 31, 2020

(87) PCT Pub. No.: WO2019/083553
PCT Pub. Date: May 2, 2019

(65) Prior Publication Data
US 2020/0285934 A1  Sep. 10, 2020

Related U.S. Application Data

(60) Provisional application No. 62/578,391, filed on Oct. 27, 2017.

(51) Int. Cl.
*G06N 3/04* (2006.01)
*G06F 17/16* (2006.01)
*G06N 3/08* (2006.01)

(52) U.S. Cl.
CPC ............... *G06N 3/04* (2013.01); *G06F 17/16* (2013.01); *G06N 3/08* (2013.01)

(58) Field of Classification Search
CPC ............ G06N 3/04; G06N 3/08; G06N 3/084; G06N 3/0454; G06F 17/16
See application file for complete search history.

(56) References Cited

U.S. PATENT DOCUMENTS

2017/0161607 A1* 6/2017 English .................... G06K 9/00
2017/0316312 A1* 11/2017 Goyal .................. G06N 3/0454

OTHER PUBLICATIONS

IN Office Action in Indian Application No. 202027014040, dated Aug. 3, 2021, 7 pages (with English translation).
(Continued)

*Primary Examiner* — Farley Abad
(74) *Attorney, Agent, or Firm* — Fish & Richardson P.C.

(57) ABSTRACT

Methods, systems, and apparatus, including computer programs encoded on a computer storage medium, for a neural network that is configured to receive a network input and to generate a network output for the network input. The neural network comprises a plurality of layers arranged in a sequence, including a plurality of capsule layers. Each particular capsule in a particular capsule layer is configured to receive respective inputs including: (i) outputs generated by capsules of a previous capsule layer that is before the particular capsule layer in the sequence, and (ii) final routing factors between capsules of the previous capsule layer and the particular capsule, wherein the final routing factors are generated by a routing subsystem. Each particular capsule in the particular capsule layer is configured to determine a particular capsule output based on the received inputs, wherein the particular capsule output is of dimension greater than one.

25 Claims, 7 Drawing Sheets

(56) References Cited

OTHER PUBLICATIONS

EP Office Action in European Application No. 17829801.4, dated Aug. 26, 2020, 13 pages.
Abadi et al., "Tensorflow: Large-scale machine learning on heterogeneous distributed systems" arXiv, 2016, 19 pages.
Ba et al, "Multiple object recognition with visual attention" arXiv, 2015, 10 pages.
Brendel et al., "Comment on Biologically inspired protection of deep networks from adversarial attacks", arXiv:1704.01547v1, Apr. 2017, 4 pages.
Chang et al, "Batch-normalized maxout network in network" arXiv, 2015, 9 pages.
Ciresan et al., "High performance neural networks for visual object classification", arXiv:1102.0183v1, Feb. 2011, 12 pages.
Cohen et al., "Group equivariant convolutional networks", International Conference on Machine Learning, 2016, pp. 2990-2999.
Dai et al., "Deformable convolutional networks", Proceedings of the IEEE International Conference on Computer Vision, 2017, pp. 764-773.
Dieleman et al., "Exploiting cyclic symmetry in convolutional neural networks", arXiv:1602.02660v2, May 2016, 10 pages.
Fasel et al., "Rotation-invariant neoperceptron", 18th International Conference on Pattern Recognition, 2006, 3:336-339.
Gens et al., "Deep symmetry networks", Advances in Neural Information Processing Systems, 2014, pp. 2537-2545.
Goodfellow et al, "Multi-digit number recognition from street view imagery using deep convolutional neural networks" arXiv, 2013, 11 pages.
Goodfellow et al., "Explaining and harnessing adversarial examples", arXiv:1412.6572v3, Mar. 2013, 11 pages.
Greff et al., "Tagger: Deep unsupervised perceptual grouping" Advances in Neural Information Processing Systems, 2016, 19 pages.
Gregor et al., "DRAW: A recurrent neural network for image generation", arXiv:1502.04623v2, May 2013, 10 pages.
Guermeur et al, "A quadratic loss multi-class svm for which a radius-margin bound applies" Informatica, 2011, 25 pages.
Hinton et al, "Learning to parse images" Advances in neural information processing systems, 2000, 7 pages.
Hinton et al., "Transforming AutoEncoders", International Conference on Artificial Neural Networks, 2011, pp. 44-51.
International Search Report and Written Opinion in International Application No. PCT/US2017/066771, dated Jul. 18, 2018, 16 pages.
Jaderberg et al., "Spatial transformer networks", Advances in Neural Information Processing Systems, 2015, pp. 2017-2025.
Jia et al., "Dynamic filter networks", Advances in Neural Information Processing Systems, 2016, pp. 667-675.
Kingma et al, "Adam: A method for stochastic optimization" arXiv, 2014, 9 pages.
Krizhevsky, "Learning multiple layers of features from tiny images", 2009, 60 pages.
Kurakin et al., "Adversarial Examples in the Physical World", arXiv:1607.02533v4, Feb. 2017, 14 pages.
Laptev et al., "TI-POOLING: transformation-invariant pooling for feature learning in convolutional neural networks", Proceedings of the IEEE Conference on Computer Vision and Pattern Recognition, 2016, pp. 289-297.
LeCun et al, The mnist database of handwritten digits, 1998, 8 pages.
LeCun et al., "Handwritten digit recognition with a back-propogation network", Advances in Neural Information Processing Systems, 1990, pp. 396-404.
LeCun et al., "Learning methods for generic object recognition with invariance to pose and lighting", IEEE Computer Society Conference on Computer Vision and Pattern Recognition, 2004, pp. II-104.
Lenc et al., "Learning Covariant Feature Detectors", arXiv:1605.01224v2, Sep. 2016, 16 pages.
Netzer et al, "Reading digits in natural images with unsupervised feature learning" NIPS, 2011, 9 pages.
Olshausen et al, "A neurobiological model of visual attention and invariant pattern recognition based on dynamic routing of information" Journal of Neuroscience, 1993, 20 pages.
O'Shea et al., "An Introduction to Convolutional Neural Networks", arXiv:1511.08458v2, Dec. 2015, 11 pages.
Oyallon et al., "Deep roto-translation scattering for object classification", Proceedings of the IEEE Conference on Computer Vision and Pattern Recognition, 2015, pp. 2865-2873.
PCT International Preliminary Report on Patentability in International Application No. PCT/US2017/066771, dated Apr. 28, 2020, 10 pages.
Pelli et al, "Crowding is unlike ordinary masking" Distinguishing feature integration from detection Journal of vision, 2004, 34 pages.
Sabour et al., "Dynamic routing between capsules", Advances in Neural Information Processing Systems, 2017, pp. 3856-3866.
Vaswani et al., "Attention is all you need", Advances in Neural Information Processing Systems, 2017, pp. 5998-6008.
Wan et al, "Regularization of neural networks using dropconnect" Proceedings of the 30th International Conference on Machine Learning, 2013, 9 pages.
Worrall et al., "Harmonic networks: Deep translation and rotation equivariance", IEEE Conference on Computer Vision and Pattern Recognition, 2017, pp. 5028-5037.
Zeiler et al, "Stochastic pooling for regularization of deep convolutional neural networks" arXiv, 2013, 9 pages.

\* cited by examiner

CAPSULE NEURAL NETWORKS

This application is a National Stage Application under 35 U.S.C. § 371 and claims the benefit of International Application No. PCT/US2017/066771, filed Dec. 15, 2017, which claims priority to U.S. Application No. 62/578,391, filed Oct. 27, 2017, the disclosure of which is incorporated herein by reference.

BACKGROUND

This specification relates to processing data using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a capsule neural network implemented as computer programs on one or more computers in one or more locations.

According to a first aspect, there is provided a neural network that is configured to receive a network input and to generate a network output for the network input, wherein: the neural network comprises a plurality of layers arranged in a sequence, including a plurality of capsule layers; each capsule layer comprises a respective plurality of capsules; and each particular capsule in a particular capsule layer is configured to: receive respective inputs including: (i) outputs generated by capsules of a previous capsule layer that is before the particular capsule layer in the sequence, and (ii) final routing factors between capsules of the previous capsule layer and the particular capsule, wherein the final routing factors are generated by a routing subsystem; and determine a particular capsule output based on the received inputs, wherein the particular capsule output is of dimension greater than one; and a routing subsystem that is configured to perform operations including: receiving outputs generated by capsules in a first capsule layer; determining final routing factors between capsules of the first capsule layer and capsules of a second capsule layer that is after the first capsule layer in the sequence; and providing the final routing factors to the capsules in the second capsule layer.

In some implementations, determining final routing factors between capsules of the first capsule layer and capsules of a second capsule layer that is after the first capsule layer in the sequence comprises: performing one or more iterations of an expectation-maximization routing algorithm, wherein each iteration of the expectation-maximization routing algorithm includes an M-step and an E-step, wherein for a particular iteration: the M-step includes, for each second capsule in the second capsule layer: determining weighted votes for the second capsule from one or more first capsules of the first capsule layer for the particular iteration, comprising: determining a vote for the second capsule from a particular first capsule of the first capsule layer by multiplying an output of the particular first capsule by a weight matrix of the second capsule that is associated with the particular first capsule; weighting the vote for the second capsule from the particular first capsule of the first capsule layer by a routing factor between the particular first capsule and the second capsule for the particular iteration; determining values of one or more parameters characterizing a distribution of weighted votes for the second capsule from the one or more first capsules of the first capsule layer for the particular iteration; determining a cost associated with the second capsule for the particular iteration based at least in part on the values of the parameters characterizing the distribution of weighted votes for the second capsule for the particular iteration; determining an activation of the second capsule for the particular iteration based at least in part on the cost associated with the second capsule for the particular iteration; and the E-step includes determining routing factors for a next iteration based on at least the activations of the capsules of the second capsule layer for the particular iteration and the values of the parameters characterizing the distributions of weighted votes associated with the capsules of the second capsule layer for the particular iteration; determining final routing factors to be the routing factors determined in a last iteration of the expectation-maximization routing algorithm.

In some implementations, weighting the vote for the second capsule from the particular first capsule of the first capsule layer further comprises: weighting the vote for the second capsule from the particular first capsule by an activation of the particular first capsule.

In some implementations, the cost associated with the second capsule for the particular iteration is further determined based at least in part on the routing factors between the first capsules of the first capsule layer and the second capsule for the particular iteration.

In some implementations, the cost associated with the second capsule for the particular iteration is further determined based at least in part on an inverse temperature parameter.

In some implementations, the parameters characterizing the distribution of weighted votes for the second capsule for the particular iteration include: a mean of the weighted votes for the second capsule from the one or more first capsules of the first capsule layer for the particular iteration; and a variance of the weighted votes for the second capsule from the one or more first capsules of the first capsule layer for the particular iteration.

In some implementations, determining final routing factors between capsules of the first capsule layer and capsules of a second capsule layer that is after the first capsule layer in the sequence comprises: performing one or more iterations of a dynamic routing algorithm, wherein a particular iteration of the dynamic routing algorithm includes: for each second capsule of the second capsule layer: determining weighted votes for the second capsule from one or more first capsules of the first capsule layer for the particular iteration, comprising: determining a vote for the second capsule from a particular first capsule of the first capsule layer by multiplying the output of the particular first capsule by a weight matrix of the second capsule that is associated with the particular first capsule; weighting the vote for the second capsule from the particular first capsule of the first capsule layer by a normalized routing factor between the particular first capsule and the second capsule for the particular iteration; determining routing factors for a next iteration, wherein determining a routing factor between a first capsule of the first capsule layer and a second capsule of the second capsule layer for the next iteration comprises: determining a sum of the weighted votes for the second capsule from the one or more first capsules of the first capsule layer for the particular iteration; determining a similarity measure between the sum of the weighted votes for the second capsule for the particular iteration and the vote for the second capsule from the first capsule; determining the routing factor between the first capsule and the second capsule for the next iteration by combining the determined similarity measure with the routing factor between the first capsule and the second capsule for the particular iteration; determining final routing factors to be the routing factors determined in a last iteration of the dynamic routing algorithm.

In some implementations, determining the sum of the weighted votes for the second capsule further comprises normalizing the sum of the weighted votes for the second capsule.

In some implementations, the similarity measure between the sum of the weighted votes for the second capsule and the vote for the second capsule from the first capsule comprises: the inner product of the sum of the weighted votes for the second capsule and the vote for the second capsule from the first capsule.

In some implementations, determining a particular capsule output based on the received inputs comprises: determining weighted votes for the particular capsule from the capsules of the previous capsule layer, comprising: determining a vote for the particular capsule from a given capsule in the previous capsule layer by multiplying the output of the given capsule by a weight matrix of the particular capsule that is associated with the given capsule; weighting the vote for the particular capsule from the given capsule in the previous capsule layer by a final routing factor between the given capsule and the particular capsule; determining the particular capsule output by combining the weighted votes for the particular capsule from the capsules of the previous capsule layer.

In some implementations, the final routing factors are normalized.

In some implementations, weighting the vote for the particular capsule from the given capsule in the previous capsule layer further comprises: weighting the vote for the particular capsule from the given capsule by an activation of the given first capsule.

In some implementations, combining the weighted votes for the particular capsule from the capsules of the previous capsule layer comprises: determining a mean of the weighted votes for the particular capsule from the capsules of the previous capsule layer.

In some implementations, determining a particular capsule output based on the received inputs further comprises: determining values of one or more parameters characterizing a distribution of the weighted votes for the particular capsule from the capsules of the previous capsule layer; determining a cost associated with the particular capsule based at least in part on the values of the parameters characterizing the distribution of the weighted votes for the particular capsule; determining an activation of the particular capsule based at least in part on the cost associated with the particular capsule.

In some implementations, the output of a capsule comprises an activity vector.

In some implementations, the output of a capsule comprises an activity matrix.

In some implementations, the neural network comprises an initial convolutional layer followed by a primary capsule layer.

In some implementations, the primary capsule layer is followed by a plurality of convolutional capsule layers.

In some implementations, a last convolutional capsule layer of the plurality of convolutional capsule layers is followed by a class capsule layer.

In some implementations, for each capsule of the class capsule layer, weight matrices of the capsule that are associated with capsules of the last convolutional capsule layer of a same type share weight values, wherein: a first capsule of a convolutional capsule layer is of a same type as a second capsule of the convolutional capsule layer if weight matrices of the first capsule share weight values with weight matrices of the second capsule; values based on the coordinates of the center of the receptive fields of capsules of the last convolutional capsule layer are added to votes of capsules of the last convolutional capsule layer.

In some implementations, the neural network is configured to receive a network input and to classify the network input as belonging to one or more of a predetermined set of classes, and wherein the class capsule layer includes a respective capsule for each class in the predetermined set.

In some implementations, an activation of a respective capsule of the class capsule layer is greater than activations of other capsules of the class capsule layer; the network input is classified as belonging to a particular class corresponding to the respective capsule of the class capsule layer.

In some implementations, the network input is an image.

The above aspects can be implemented in any convenient form. For example, aspects and implementations may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs.

Particular embodiments of the subject matter described in this specification can be implemented so as to realize one or more of the following advantages. Capsule neural networks can include a dynamic routing system to route the outputs of lower layers of the capsule network to higher layers of the capsule network, where the routing of outputs between capsule network layers is dynamically determined based on the outputs themselves. The dynamic routing system described in this specification facilitates superior performance (e.g., superior neural network prediction accuracy) relative to conventional routing methods. In some conventional routing methods, the routing of outputs between neural network layers is pre-determined, and in some other conventional routing methods such as max-pooling methods, the routing is dynamically determined by routing only the largest outputs and discarding the others. The dynamic routing system as described in this specification facilitates superior performance relative to such conventional routing methods because it enables a more flexible routing of outputs, thereby allowing a neural network including the dynamic routing system as described in this specification to route relevant information more effectively and generate more accurate predictions as a result.

Capsule networks as described in this specification may consume fewer computational resources than conventional neural networks. For example, in the setting of image processing and computer vision, a conventional neural network that is configured to process input images is typically trained on a large number of input images depicting objects and scenes from different viewpoints. Training a conventional neural network in this manner may endow the conventional neural network with some capacity to make accurate predictions about objects and scenes depicted from a variety of viewpoints. Capsule networks as described in this specification can naturally generalize to make accurate predictions about objects and scenes depicted from a variety of viewpoints, even when trained on less training data than conventional neural networks. Since training a neural network based on a larger training set consumes more computational resources, training capsule networks may consume fewer computational resources (e.g., memory and processing power) than training conventional neural networks. Furthermore, since capsule networks as described in this specification can naturally generalize to make accurate predictions about objects and scenes depicted from a variety of viewpoints, a capsule network that has similar prediction accuracy as a conventional neural network can (in some situations) be implemented with fewer parameters than the conventional neural network, thereby reducing the amount of memory required to maintain the neural network, the amount of data. required to train the neural network, and the amount of processing power required to process inputs using the neural network.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
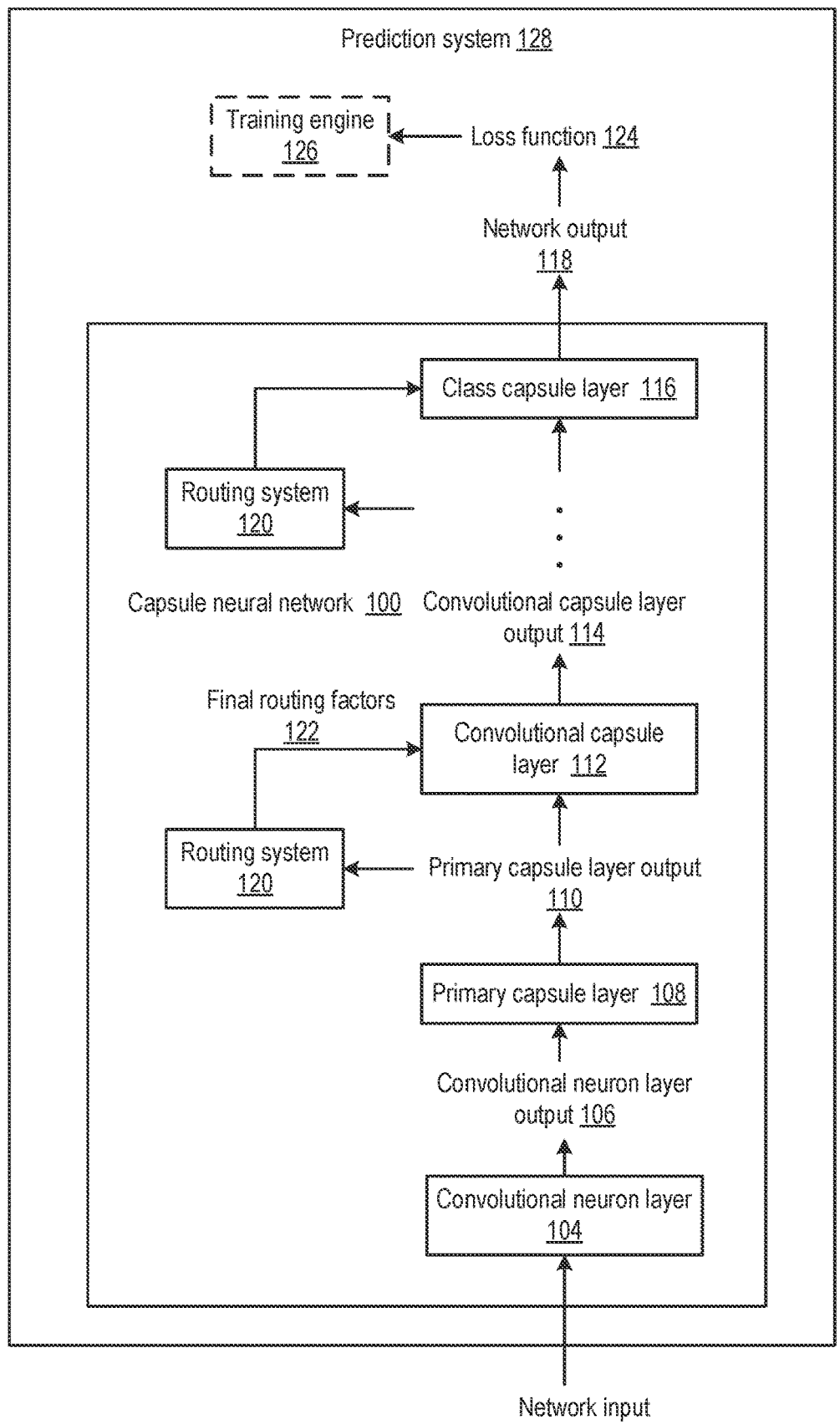
FIG. 1A is an illustration of an example prediction system.

This specification generally describes capsule neural networks that are implemented by one or more computers in one or more locations. A capsule neural network includes multiple layers arranged in a sequence, including one or more capsule layers, and in some cases, one or more neuron layers.

A neuron layer refers to a conventional neural network layer composed of neurons. Each neuron is configured to generate a neuron output. A neuron output is a single number. Each neuron has a set of parameter values and an activation function. A neuron generates a neuron output by computing a weighted linear combination of neuron inputs and applying an activation function to the weighted linear combination. The weights of the linear combination are given by the parameter values of the neuron. Generally, activation functions are a non-linear function of the weighted linear combination. Examples of activation functions include rectified linear unit activation functions and sigmoid activation functions.

A convolutional neuron layer is a neuron layer where the neurons (and their outputs) may be logically organized into a rectangular array with a length, a width, and a depth. Each of the neurons corresponding to a particular depth is referred to as being of a particular neuron type. Neurons of the same type within a given convolutional neuron layer share parameter values.

A capsule layer refers to a neural network layer composed of capsules. Each capsule is configured to generate a capsule output and, in some cases, a capsule activation. The capsule output includes two or more numbers and may be represented as a vector or as a matrix. A capsule generates a capsule output by processing a capsule input in accordance with a set of capsule parameters. In general, the capsule activation is a number (i.e., not a vector or a matrix). An example process for determining a capsule output and a capsule activation is described with reference to FIG. 5.

In some cases, capsules in a given capsule layer are configured to receive as input capsule outputs of one or more capsules of a previous capsule layer and final routing factors that are determined by a routing system. In these cases, the set of capsule parameters includes one or more weight matrices, where each weight matrix of a capsule corresponds to a capsule of a previous capsule layer.

In some other cases, capsules in a given capsule layer are configured to receive as input neuron outputs of neurons of a previous neuron layer. Such capsules are not configured to receive final routing factors that are determined by the routing system.

The receptive field of a particular capsule refers to the neurons or capsules of previous layers which have outputs that are provided as input, either directly or indirectly, to the particular capsule. An output of a neuron or capsule is said to be indirectly provided as input to a particular capsule if the output of the neuron or capsule affects the output generated by the particular capsule. For example, if a first capsule provides an input directly to a second capsule, and the second capsule provides an input directly to a third capsule, then the output of the first capsule is said to be indirectly provided as input to the third capsule.

A convolutional capsule layer is a capsule layer where the capsules are logically organized into a rectangular array with a length, a width, and a depth. Each of the capsules corresponding to a particular depth is referred to as being of a particular capsule type. Capsules of the same type within a given convolutional capsule layer share parameter values.

In this specification, a primary capsule layer refers to a capsule layer that is configured to receive as input neuron outputs of neurons of a previous neuron layer. In some cases, primary capsule layers may be convolutional capsule layers.

The routing system determines how to route outputs between capsule layers of the capsule network. Specifically, the routing system receives outputs generated by capsules of one capsule layer of the capsule network and determines how to route the outputs to capsules of another capsule layer that is after the capsule layer in the capsule network. The routing system determines how to route the outputs by determining final routing factors between the capsules of the first capsule layer and the capsules of the second capsule layer. Routing factors are scalar values that are associated with pairs of capsules of the capsule network.

Capsule networks can be trained to perform prediction tasks. In general, capsule networks can be used in place of conventional convolutional neural networks (i.e., networks with multiple convolutional neuron layers but without capsule layers) or other conventional neural networks.

For example, a capsule network can be configured to receive as input an image and to process the image to perform image classification or object detection tasks. For image classification tasks, the capsule network may generate outputs indicating respective probabilities that input images depict different types of objects (e.g., dogs or cats). For object detection tasks, the capsule network may generate outputs indicating locations of different types of objects depicted in input images (e.g., coordinates of bounding boxes around the different types of objects in the input images).

Capsule networks can be configured to perform other tasks, such as video analysis. For video analysis, the capsule network is configured to receive as input video data and to process the video data to perform video classification (e.g., to predict the topic of the video). Capsule networks can also be configured to perform natural language processing tasks, where the capsule network is configured to receive as input text data and to process the text data to perform, for example, machine translation. Capsule networks can also be configured to perform speech recognition, where the capsule network is configured to receive as input audio data and to process the audio data to generate as output a text transcription of a spoken utterance from the audio data.

FIG. 1A is an illustration of an example prediction system. The prediction system 128 is an example of a system implemented as computer programs on one or more computers in one or more locations in which the systems, components, and techniques described below are implemented.

The prediction system 128 includes a capsule neural network 100. The architecture of the capsule neural network 100 described in this specification is an example of a possible capsule network architecture. In general, different capsule network architectures may be implemented.

The network 100 is configured to receive a network input 102 and to generate a network output 118 for the network input 102. In some implementations, the network 100 is configured to classify the network input 102 as belonging to one or more of a predetermined set of classes. For example, the network 100 may be configured to perform image classification tasks, where the network input 102 is an image and the network output 118 indicates a class of object depicted in the input image.

The network 100 provides the network input 102 to a convolutional neuron layer 104 that is configured to process the network input 102 in accordance with a set of convolutional neuron layer parameters to generate a convolutional neuron layer output 106. As previously described, the convolutional neuron layer output 106 may be logically organized into a rectangular array with a length, a width, and a depth.

The network 100 provides the convolutional neuron layer output 106 as input to a primary capsule layer 108 that is configured to process the convolutional neuron layer output 106 in accordance with a set of primary capsule layer parameters to generate a primary capsule layer output 110. In some implementations, the primary capsule layer 108 is a convolutional capsule layer. In some implementations, for each capsule of the primary capsule layer 108, the capsule determines each component of the capsule output (i.e., each element of the capsule output vector/matrix) as a different linear combination of the components of the convolutional neuron layer output 106 (i.e., the elements of the rectangular array of convolutional neuron layer outputs). In some implementations, for each capsule of the primary capsule layer 108, the capsule determines a capsule activation by applying an activation function (e.g., a rectified linear unit activation function) to a linear combination of the components of the convolutional neuron layer output 106. The weights of the linear combinations that the capsule uses to determine the capsule output and the capsule activation are parameters of the capsule. In some implementations, the receptive field of each capsule of the primary capsule layer in the convolutional neuron layer 104 is a respective column of the convolutional neuron layer 104. A column refers to a set of neurons of the convolutional neuron layer 104 that have the same length and width position but different depth positions.

The network 100 provides the primary capsule layer output 110 to a routing system 120. The routing system 120 processes the primary capsule layer output 110 to generate as output final routing factors 122. Each of the final routing factors 122 is a scalar value that is associated with a pair of capsules including (i) a capsule of the convolutional capsule layer 112 and (ii) a capsule of the primary capsule layer 108 that is in the receptive field of the capsule of the convolutional capsule layer 112. An example process for determining final routing factors between capsule layers is described with reference to FIG. 2.

The network provides the final routing factors 122 and the primary capsule layer output 110 as input to the convolutional capsule layer 112. For each particular capsule of the convolutional capsule layer 112, the particular capsule processes the outputs of capsules in the primary capsule layer 108 that are in the receptive field of the particular capsule. The particular capsule also processes the final routing factors 122 that are associated with pairs of capsules including both the particular capsule and a capsule in the primary capsule layer 108 in the receptive field of the particular capsule. The particular capsule processes the respective outputs and routing factors in accordance with a set of parameters including one or more weight matrices, where each weight matrix of the particular capsule corresponds to a capsule of the primary capsule layer 108 in the receptive field of the particular capsule. The particular capsule generates an output (which is in general a vector or a matrix), and in some cases, an activation (which is in general a scalar value). An example process for determining a capsule output and a capsule activation is described with reference to FIG. 5. The convolutional capsule layer output 114 is composed of the outputs generated by the capsules of the convolutional capsule layer 112.

In some implementations, the network 100 includes multiple additional capsule layers after the convolutional capsule layer 112 and before the class capsule layer 116. For each additional capsule layer, the additional capsule layer is configured to process outputs generated by a previous capsule layer and final routing factors between the previous capsule layer and the additional capsule layer generated by the routing system 120, to generate a respective capsule layer output.

The class capsule layer 116 is the last capsule layer of the network 100. In some implementations, the network 100 is configured to classify the network input 102 as belonging to one or more of a predetermined set of classes. In some of these implementations, the class capsule layer 116 includes a respective capsule for each class in the predetermined set of classes. In some of these implementations, each class of the predetermined set of classes may correspond to a class of object. The class capsule layer 116 is configured receive outputs generated by a previous capsule layer and routing factors generated by the routing system 120 between the previous capsule layer and the class capsule layer, and to process these inputs to generate a network output 118.

In some implementations, the network output 118 is the activation of each capsule of the class capsule layer 116. In some of these implementations, the network input 102 is determined to belong to a particular class in the predetermined set of classes if the activation of the capsule of the class capsule layer 116 corresponding to the particular class is greater than the activations of other capsules of the class capsule layer 116.

In some other implementations, the network output 118 is the output of each capsule of the class capsule layer 116. In some of these implementations, the network input 102 is determined to belong to a particular class in the predetermined set of classes if the norm (e.g., the Euclidean norm) of the output of the capsule of the class capsule layer 116 corresponding to the particular class is greater than the norms of the outputs of other capsules of the class capsule layer 116.

In some implementations, the system 128 includes a training engine 126 that adjusts the parameters of the network 100 based on a loss function 124. In some implementations, the network 100 is configured to classify the network input 102 as belonging to one or more of a predetermined set of classes, the class capsule layer 116 includes a respective capsule for each class in the predetermined set, and the network output 118 is the output of each capsule of the class capsule layer 116. In some of these implementations, the loss function 124 is given by a sum of loss terms, where each loss term corresponds to a different class capsule, and the loss term corresponding to class capsule c is given by:

$$T_c \max(0, m^+ - |v_c|)^2 + \lambda(1 - T_c)\max(0, |v_c| - m^-)^2,$$

where $T_c = 1$ if and only if the network input 102 belongs to class c, $|v_c|$ is norm of the output of class capsule c (e.g., the Euclidean norm), and $m^+$, $m^-$, and $\lambda$ are fixed hyperparameters of the loss function that may be selected in any appropriate manner (e.g., arbitrarily or by a cross-validation process). In some implementations, the network output 118 is the activation of each capsule of the class capsule layer 116, and the loss function 124 is given by:

$$\sum_{i \neq t} L_i,$$

where:

$$L_i = (\max(0, m - (a_t - a_i)))^2,$$

where the network input 102 belongs to class t, $a_t$ is the activation of class capsule t, $a_i$ is the activation of class capsule i, m is a fixed hyperparameter of the loss function that may be selected in any appropriate manner, and the sum is over each class of the predetermined set of classes.

The training engine 126 adjusts the parameters of the network 100 based on the loss function 124 by determining network outputs 118 for inputs in a set of training data. For each input in the set of training data, the class membership of the input is known. For example, if the training engine 126 trains the network 100 to perform image classification tasks, then the training data may include images and corresponding image class labels, where the image class label indicates the type of object depicted in the corresponding image. Based on the network outputs generated by the network 100 for the inputs of the training data, the training engine 126 backpropagates gradients of the loss function 124 to adjust the parameters of the network 100. The training engine 126 can use any appropriate neural network training technique, such as stochastic gradient descent. The parameters of the network 100 that are adjusted during the training include parameters of the neuron layers (e.g., the convolutional neuron layer 104), the capsule layers (e.g., the primary capsule layer 108, the convolutional capsule layer 112, and the class capsule layer 118), and the routing system 120.

In this specification, parameters referred to as vectors or matrices can be stored by the network 100 in any appropriate format that enables their use in the manner described in this specification. For example, parameters referred to as matrices need not be stored by the network 100 in the form of matrices (e.g., they may be stored as vectors or in any other appropriate format).

Figure 1B:
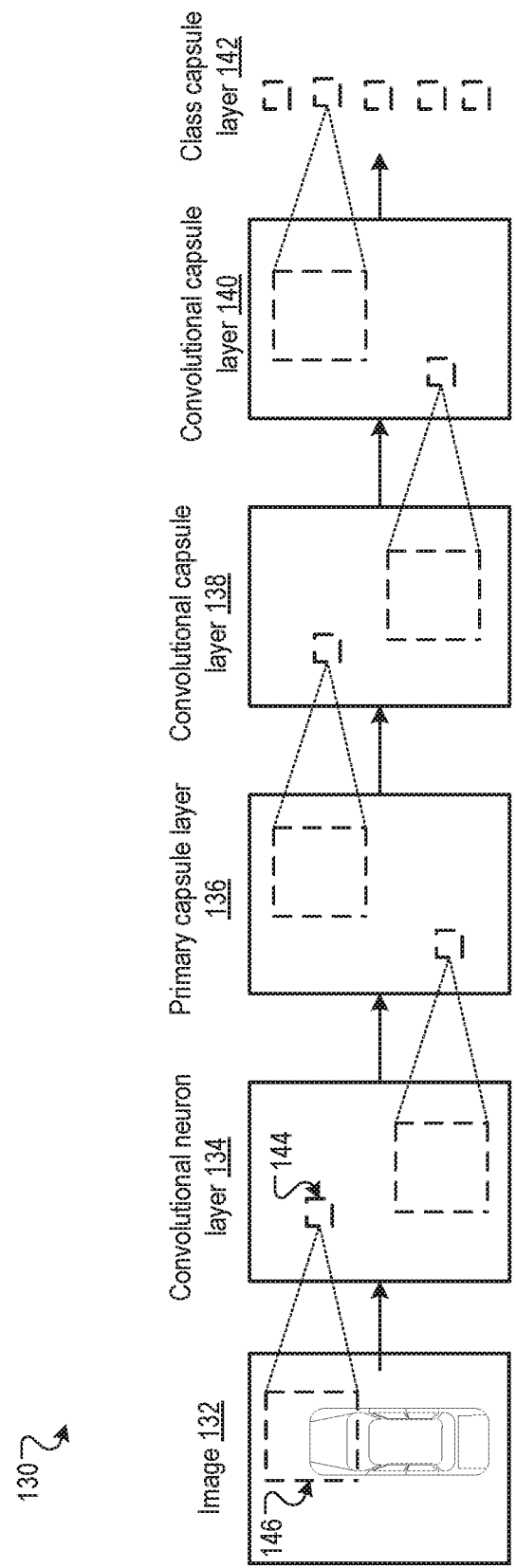
FIG. 1B is an illustration of an example architecture of a capsule neural network.

FIG. 1B is an illustration of an example architecture of a capsule neural network, e.g., the capsule neural network 100 of FIG. 1A. The capsule neural network 130 receives as input an image 132, and processes the input with a convolutional neuron layer 134, a primary capsule layer 136, convolutional capsule layers 138 and 140, and a class capsule layer 142. The receptive fields of the neurons and capsules of the respective layers are illustrated. For example, the neuron 144 of the convolutional neuron layer 134 has receptive field 146 in the image 132.

Figure 2:
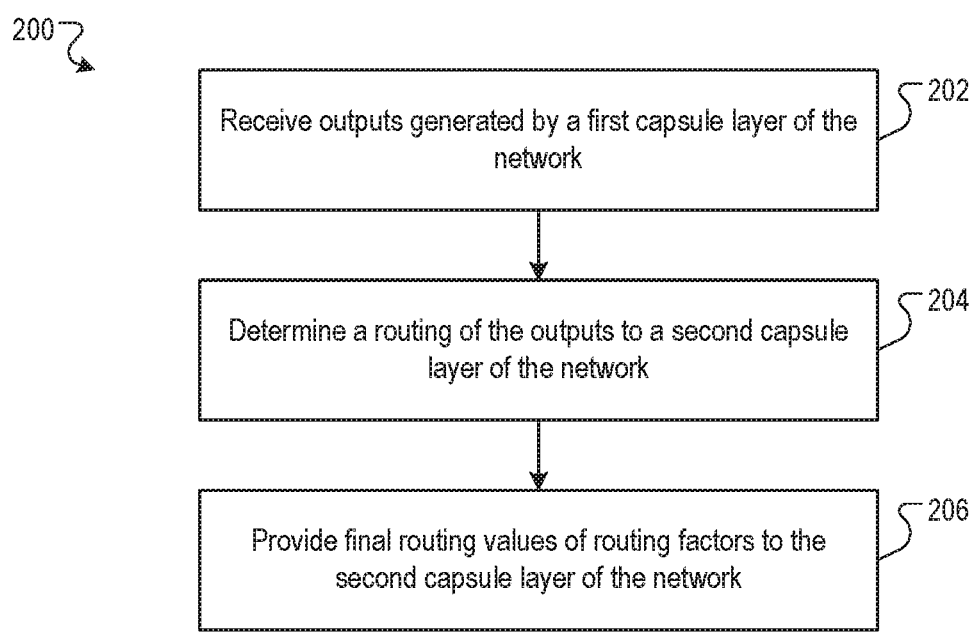
FIG. 2 is a flow diagram of an example process for determining final routing factors between capsule layers.

FIG. 2 is a flow diagram of an example process for determining final routing factors between capsule layers. For convenience, the process 200 will be described as being performed by a system of one or more computers located in one or more locations. For example, a routing system, e.g., the routing system 120 of FIG. 1A, appropriately programmed in accordance with this specification, can perform the process 200.

The system receives outputs generated by a first capsule layer of the capsule network (202). For example, the system may receive outputs generated by a convolutional capsule layer, or any other kind of capsule layer.

The system determines a routing of the outputs to a second capsule layer of the capsule network that is after the first capsule layer (202). Determining a routing of the outputs includes determining final routing factors between the capsules of the first capsule layer and capsules of the second capsule layer. An example process for determining final routing factors using an expectation-maximization routing algorithm is described below with reference to FIG. 3A. An example process for determining final routing factors using a dynamic routing algorithm is described below with reference to FIG. 4.

The system provides the final routing factors to the second capsule layer of the capsule network (206).

Figure 3A:
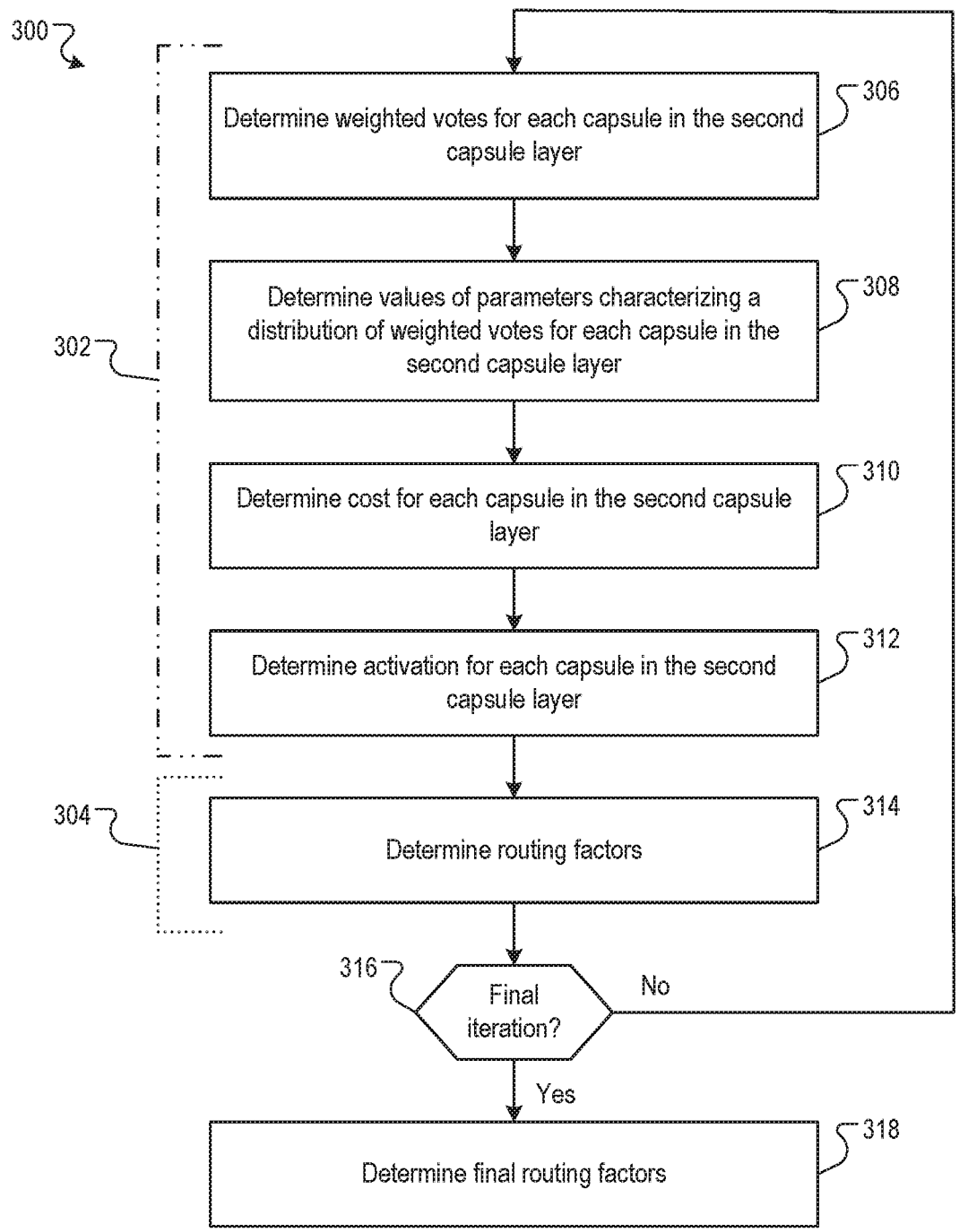
FIG. 3A is a flow diagram of an example process for determining final routing factors between a first capsule layer and a second capsule layer (that is after the first capsule layer) using an expectation-maximization routing algorithm.

FIG. 3A is a flow diagram of an example process for determining final routing factors between a first capsule layer and a second capsule layer (that is after the first capsule layer) using an expectation-maximization routing algorithm. For convenience, the process 300 will be described as being performed by a system of one or more computers located in one or more locations. For example, a routing system, e.g., the routing system 120 of FIG. 1A, appropriately programmed in accordance with this specification, can perform the process 300.

The expectation-maximization routing algorithm is an iterative algorithm. Each iteration of the expectation-maximization routing algorithm includes two steps: a maximization step, referred to as an M-step (302), that includes 306, 308, 310, and 312, and an expectation step, referred to as an E-step (304), that includes 314. An example data flow of an iteration of a maximization step of an expectation maximization routing algorithm is described with reference to FIG. 3B.

For each second capsule of the second capsule layer, the system determines weighted votes for the second capsule from the first capsules of the first capsule layer in the receptive field of the second capsule (306).

In particular, for a given second capsule in the second capsule layer, the system determines a respective vote for the given second capsule from each particular first capsule of the first capsule layer in the receptive field of the second capsule. Each second capsule of the second capsule layer has a respective weight matrix corresponding to each particular first capsule of the first capsule layer in the receptive field of the second capsule. To determine a vote for the second capsule from a particular first capsule, the system multiplies the output of the particular first capsule by the weight matrix of the second capsule that corresponds to the particular first capsule. In some implementations, the output of the particular first capsule is a vector. In these implementations, the weight matrix of the second capsule corresponding to the particular first capsule is a matrix with a number of columns that is the same as the dimensionality of the output of the particular first capsule and at least two rows. For example, if the output of the particular first capsule is a n×1 vector, then the weight matrix of the second capsule corresponding to the particular first capsule is a r×n matrix, where r is an integer value of two or greater. In some implementations, the output of the particular first capsule is a matrix. In these implementations, the weight matrix of the second capsule corresponding to the particular first capsule is a matrix with at least two rows and with a number of columns that is the same as the number of rows of the output of particular first capsule. For example, if the output of the particular first capsule is a n×n matrix, then the weight matrix of the second capsule corresponding to the particular first capsule is a r×n matrix, where r is an integer vale of two or greater.

In some implementations, when the first capsule layer and the second capsule layer are both convolutional capsule layers, the weight matrices of capsules of a second type in the second capsule layer corresponding to capsules of a first type in the first capsule layer are all shared (i.e., the weight matrices are the same). In some of these implementations, the system adds the coordinates of the center of the receptive field of the particular first capsule in the input image to the vote for the second capsule from the particular first capsule. In some implementations, the coordinates of the center of the receptive field of the first capsule are given by the x-y coordinates (in the frame of reference of the input image) of a pixel that is determined to be the center (e.g., the centroid) of the set of pixels of the input image in the receptive field of the first capsule. In some implementations, the coordinates of the center of the receptive field of the particular first capsule may be scaled (e.g., such that each coordinate is in the range 0 to 1). In some implementations, when the vote for the second capsule from the particular first capsule is a matrix, the system adds the coordinates of the center of the receptive field of the particular first capsule to the first two components of the rightmost column of the vote for the second capsule from the particular first capsule (e.g., the x-coordinate of the center of the receptive field may be added to the first component of the rightmost column of the vote and the y-coordinate may be added to the second component of the rightmost column of the vote).

For each particular first capsule of the first capsule layer in the receptive field of the second capsule, the system weights the vote for the second capsule from the particular first capsule by the value of a routing factor between the particular first capsule and the second capsule for the current iteration. Weighting a vote refers to multiplying the vote by a scalar value. For iterations after the first iteration of the expectation-maximization routing algorithm, the value of the routing factor for the current iteration is determined in a previous iteration of the expectation-maximization algorithm. For the first iteration of the expectation-maximization algorithm, the value of the routing factor may be given by an arbitrary value. For example, for the first iteration of the expectation-maximization routing algorithm, the values of the routing factors between capsules of the first capsule layer and capsules of the second capsule layer may be initialized to a uniform value. In some implementations, the system additionally weights the vote for the second capsule from the particular first capsule by the value of an activation of the particular first capsule.

For each second capsule in the second capsule layer, the system determines values of parameters characterizing a distribution of weighted votes for the second capsule from the one or more first capsules of the first capsule layer that are in the receptive field of the second capsule (308).

In some implementations, the parameters characterizing the distribution of weighted votes for the second capsule from the one or more first capsules of the first capsule layer includes a mean of the weighted votes. For example, the parameters characterizing the distribution of weighted votes for the second capsule may include a parameter given by:

$$\mu = \frac{\Sigma_i r_i a_i V_i}{\Sigma_i r_i a_i},$$

where $r_i$ is the routing factor between capsule i of the first capsule layer and the second capsule for the current iteration, $a_i$ is an activation of capsule i, and $V_i$ is the vote of capsule i for the second capsule. In this case, the distribution parameter $\mu$ has the same dimensionality (i.e., the same vector or matrix dimensionality) as the votes $\{V_i\}$ of the capsules of the first capsule layer.

In some implementations, the parameters characterizing the distribution of weighted votes for the second capsule from the one or more first capsules of the first capsule layer includes a variance of the weighted votes. For example, the parameters characterizing the distribution of weighted votes for the second capsule may include parameters $\{\sigma_h^2\}_h$, where h is an index over the components of votes for second capsules of the second capsule layer from first capsules of the first capsule layer, where:

$$\sigma_h^2 = \frac{\Sigma_i r_i a_i (V_{ih} - \mu_h)^2}{\Sigma_i r_i a_i},$$

where $r_i$ is the routing factor between capsule i of the first capsule layer and the second capsule for the current iteration, $a_i$ is an activation of capsule i, and $V_{ih}$ is the h-th component of the vote of capsule i for the second capsule, and $\mu_h$ is the h-th component of the mean of the weighted votes (as previously described).

For each second capsule in the second capsule layer, the system determines a cost associated with the second capsule based on at least the values of the parameters characterizing the distribution of weighted votes associated with the second capsule (310). In some implementations, the cost associated with the second capsule is further determined based on at least the routing factors between: (i) the one or more first capsules in the receptive field of the second capsule and (ii) the second capsule (for the current iteration). For example, the cost associated with the second capsule may be given by $\{cost_h\}_h$, where h is an index over the components of votes for second capsules of the second capsule layer from first capsules of the first capsule layer, where:

$$cost_h = (\beta_{bv} + \log(\sigma_h)) \sum_i r_i a_i,$$

where the sum is over all capsules i in the first capsule layer that are in the receptive field of the second capsule, $r_i$ is the routing factor between capsule i of the first capsule layer and the second capsule for the current iteration, $a_i$ is an activation of capsule i, $\sigma_h^2$ is the h-th component of the variance of the weighted votes (as previously described), and $\beta_v$ is a parameter of the cost function. In some cases, the system determines the value of the parameter $\beta_v$ during the training of the capsule network (e.g., by iteratively adjusting the value of the parameter $\beta_v$ by backpropagating gradients).

For each second capsule in the second capsule layer, the system determines an activation of the second capsule (312). In some implementations, the system determines the activation of the second capsule based on the cost associated with the second capsule (i.e., the cost computed in 310). For example, the system may determine the activation of the second capsule as:

$$a = \text{sigmoid}\left(\lambda\left(\beta_a - \sum_h cost_h\right)\right),$$

where the sum is over the components h of the votes for the second capsule, sigmoid refers to the sigmoid function, $\lambda$ is an inverse temperature parameter, $\beta_a$ is a parameter of the activation function, and $cost_h$ is the h-th component of the cost associated with the second capsule. In some cases, the system determines the value of the parameter $\beta_a$ during training of the capsule network (e.g., by iteratively adjusting the value of the parameter $\beta_a$ by backpropagating gradients). In some cases, the value of the inverse temperature parameter $\lambda$ changes between iterations of the expectation-maximization routing algorithm in accordance with a fixed schedule. More specifically, in some cases, the value of the inverse temperature parameter $\lambda$ increases between iterations of the expectation-maximization routing algorithm in accordance with a fixed schedule. For example, the value of the inverse temperature parameter may increase by a fixed factor at each iteration.

The system determines values of routing factors for the next iteration of the expectation-maximization routing algorithm (314). In some implementations, the system determines the values of the routing factors for the next iteration based on at least the activations of the capsules of the second capsule layer for the current iteration and the values of the parameters characterizing the distributions of weighted votes associated with the capsules of the second capsule layer for the current iteration. For example, for each particular capsule of the first capsule layer, the system may determine the values of the routing factors between the particular capsule and capsules in the second capsule layer that receive votes from the particular capsule for the next iteration as:

$$p_c = \frac{1}{\sqrt{\Pi_h 2\pi\sigma_{ch}^2}} \exp\left(-\sum_h \frac{(V_{ch} - \mu_{ch})^2}{2\sigma_{ch}^2}\right),$$

$$r_c = \frac{a_c p_c}{\Sigma_j a_j p_j},$$

where c and j index the second capsules of the second capsule layer that receive votes from the particular capsule of the first capsule layer, h indexes the components of the votes for capsules of the second layer from capsules of the first layer, $V_{ch}$ is the h-th component of the vote of the particular capsule of the first capsule layer and capsule c of the second capsule layer, $\sigma_{ch}^2$ is the h-th component of the variance of the weighted votes for capsule c (as previously described), $\mu_{ch}$ is the h-th component of the mean of the weighted votes for capsule c (as previously described), $r_c$ is the routing factor for the next iteration between the particular capsule and the capsule c of the second capsule layer, and $a_c$ is the activation of the second capsule c.

The system determines whether the current iteration is the final iteration of the expectation-maximization routing algorithm (316). In some implementations, the system may determine that the current iteration is the final iteration if the current iteration is the last iteration of a pre-determined number of iterations. In some implementations, the system may determine that the current iteration is the final iteration if the values of the routing factors between capsules of the first capsule layer and capsules of the second capsule layer determined for the current iteration are sufficiently similar to the values of the routing factors determined for the previous iteration (e.g., have an average difference that is less than a predetermined threshold). In some implementations, the system may determine that the current iteration is the final iteration if the activations of the capsules of the second capsule layer determined for the current iteration are sufficiently similar to the activations of the capsules of the second capsule layer determined for the previous iteration.

In response to determining that the current iteration is not the final iteration, the system returns to 306 and repeats the preceding steps.

In response to determining that the current iteration is the final iteration, the system determines the final routing factors (318). In some implementations, the system determines the final routing factors to be the routing factors determined in the final iteration of the expectation-maximization routing algorithm.

Figure 3B:
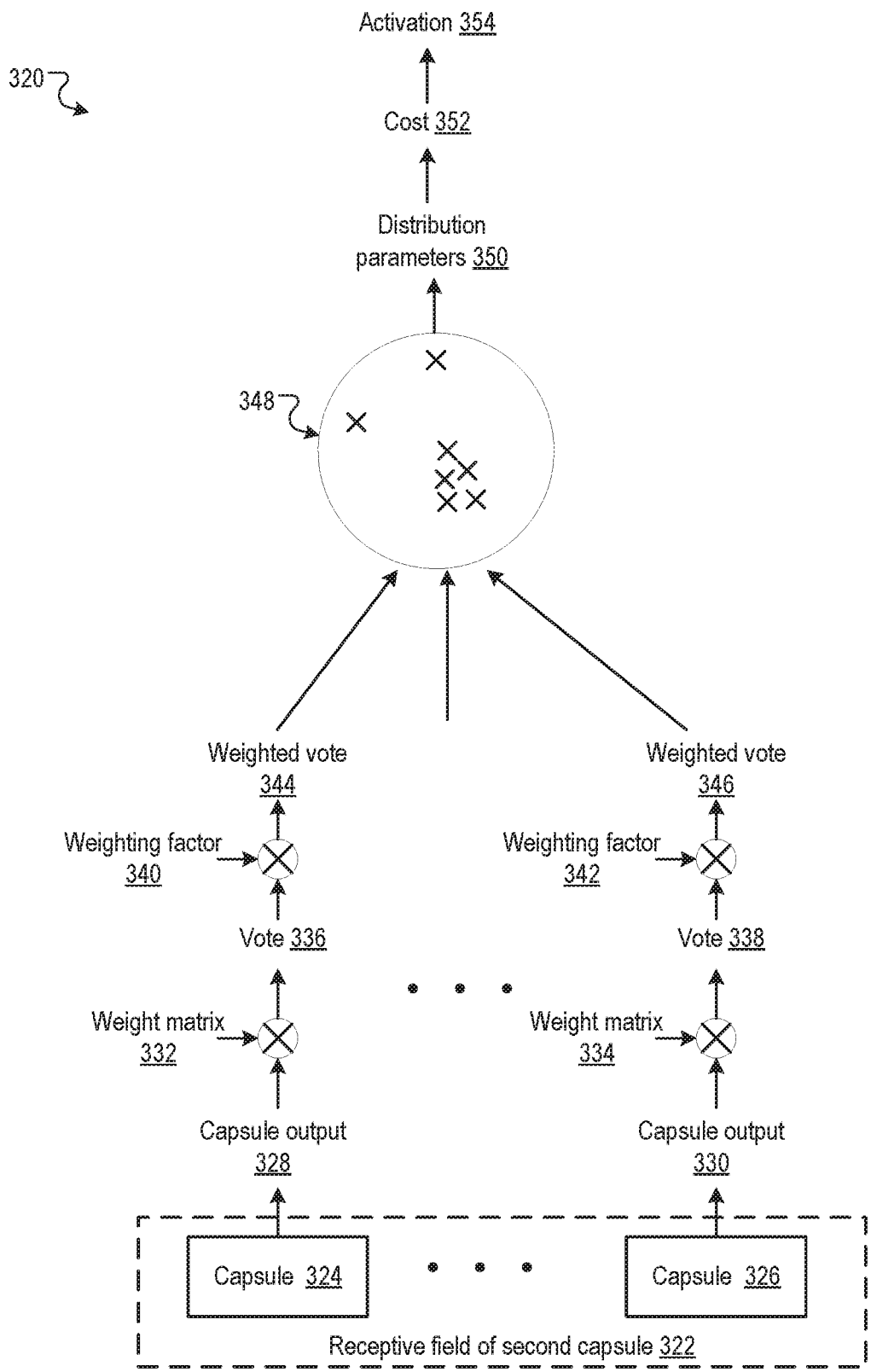
FIG. 3B is an illustration of an example data flow of an iteration of a maximization step of an expectation maximization routing algorithm.

An example data flow of an iteration of a maximization step of an expectation-maximization routing algorithm for a second capsule of a second capsule layer that is after a first capsule layer is described with reference to FIG. 3B.

Each capsule of the first capsule layer (e.g., 324, 326, . . . ) that is in the receptive field of the second capsule 322 has a capsule output (e.g., 328, 330, . . . ). The system multiples the capsule outputs of the first capsule layer by weight matrices (e.g., 332, 334, . . . ) to determine votes (e.g., 336, 338, . . . ). The system weights the votes by weighting factors (e.g., 340, 342, . . . ) to determine weighted votes (e.g., 344, 346, . . . ). 348 illustrates the weighted votes for the second capsule in a 2-dimensional space. In general, the weighted votes for the second capsule may belong to a space with a dimension of higher than 2. The system determines distribution parameters 352 that characterize the distribution of weighted votes for the second capsule. The system determines a cost 352 and an activation 354 of the second capsule.

Figure 4:
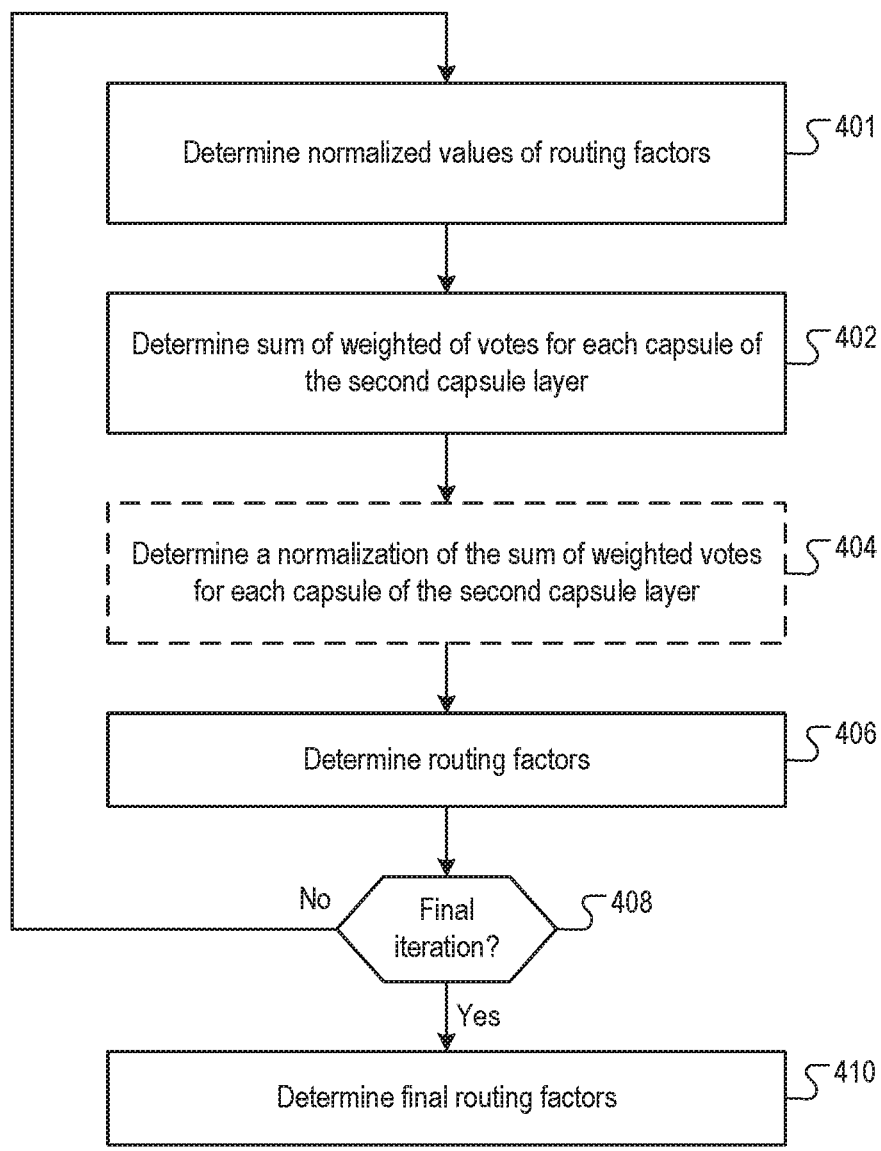
FIG. 4 is a flow diagram of an example process for determining final routing factors between a first capsule layer and a second capsule layer (that is after the first capsule layer) using a dynamic routing algorithm.

FIG. 4 is a flow diagram of an example process for determining final routing factors between a first capsule layer and a second capsule layer (that is after the first capsule layer) using a dynamic routing algorithm. For convenience, the process 400 will be described as being performed by a system of one or more computers located in one or more locations. For example, a routing system, e.g., the routing system 120 of FIG. 1A, appropriately programmed in accordance with this specification, can perform the process 400.

The system determines normalized values of routing factors between capsules of the first capsule layer and capsules of the second capsule layer for the current iteration (401).

For iterations after the first iteration of the dynamic routing algorithm, the values of the routing factors for the iteration are determined in a previous iteration of the dynamic routing algorithm. In some implementations, the system determines the routing factors for the first iteration of the dynamic routing algorithm to be arbitrary values. For example, the system may initialize the values of the routing factors for the first iteration to a uniform value. In some implementations, the system learns the values of the routing factors for the first iteration during training (e.g., by iteratively adjusting the values of the routing factors for the first iteration by backpropagating gradients). In these implementations, the value of a routing factor between a first capsule of the first capsule layer and a second capsule of the second capsule layer for the first iteration of the dynamic routing algorithm depends on the type and location of the first and second capsules, but not the network input.

In some implementations, the system determines normalized values of routing factors between capsules of the first capsule layer and capsules of the second capsule layer for the current iteration as:

$$c_i = \text{softmax}(b_i),$$

where the system performs the normalization for each first capsule i of the first capsule layer, $b_i$ is a vector of routing factors between first capsule i and second capsules of the second capsule layer that receive votes from capsule i for the current iteration, and $c_i$ is a vector of normalized values of the routing factors between first capsule i and second capsules of the second capsule layer that receive votes from capsule i for the current iteration.

For each second capsule in the second capsule layer, the system determines a sum of weighted votes for the second capsule from the first capsules of the first capsule layer in the receptive field of the second capsule (402).

In particular, for a given second capsule in the second capsule layer, the system determines a respective vote for the given second capsule from each particular first capsule of the first capsule layer in the receptive field of the second capsule. Each second capsule of the second capsule layer has a respective weight matrix corresponding to each particular first capsule of the first capsule layer in the receptive field of the second capsule. To determine a vote for the second capsule from a particular first capsule, the system multiplies the output of the particular first capsule by the weight matrix of the second capsule that corresponds to the particular first capsule. In some implementations, the output of the particular first capsule is a vector. In these implementations, the weight matrix of the second capsule corresponding to the particular first capsule is a matrix with at least two rows and a number of columns that is the same as the dimensionality of the output of the particular first capsule. For example, if the output of the particular first capsule is a n×1 vector, then the weight matrix of the second capsule corresponding to the particular first capsule is a r×n matrix, where r is an integer value of at least two. In some implementations, the output of the particular first capsule is a matrix. In these implementations, the weight matrix of the second capsule corresponding to the particular first capsule is a matrix that has at least two rows and a number of columns that is the same as the number of rows of the output of the particular first capsule. For example, if the output of the particular first capsule is a n×n matrix, then the weight matrix of the second capsule corresponding to the particular first capsule is a r×n matrix, where r is an integer value of at least two.

In some implementations, when the first capsule layer and the second capsule layer are both convolutional capsule layers, the weight matrices of capsules of a second type in the second capsule layer corresponding to capsules of a first type in the first capsule layer are all shared (i.e., the weight matrices are the same). In some of these implementations, the system adds the coordinates of the center of the receptive field of the particular first capsule in the input image to the vote for the second capsule from the particular first capsule. In some implementations, the coordinates of the center of the receptive field of the first capsule are given by the x-y coordinates (in the frame of reference of the input image) of a pixel that is determined to be the center (e.g., the centroid) of the set of pixels of the input image that are in the receptive field of the first capsule. In some implementations, the coordinates of the center of the receptive field of the particular first capsule may be scaled (e.g., such that each coordinate is in the range 0 to 1). In some implementations, when the vote for the second capsule from the particular first capsule is a matrix, the system adds the coordinates of the center of the receptive field of the particular first capsule to the first two components of the rightmost column of the vote for the second capsule from the particular first capsule (e.g., the x-coordinate of the center of the receptive field may be added to the first component of the rightmost column of the vote and the y-coordinate may be added to the second component of the rightmost column of the vote).

In some implementations, the system determines the sum of weighted votes for each second capsule j of the second capsule layer as:

$$s_j = \sum_i c_{ij} V_{j|i},$$

where i indexes capsules of the first capsule layer that are in the receptive field of capsule j, $c_{ij}$ is the normalized routing factor between capsule i and capsule j for the current iteration, and $V_{j|i}$ is the vote of capsule i of the first capsule layer for capsule j of the second capsule layer.

In some implementations, the system normalizes the sum of weighted votes for each second capsule of the second capsule layer (404). For example, the system may normalize the sum of the weighted votes for each second capsule of the second capsule layer to have a norm (e.g., a Euclidean norm) between 0 and 1, e.g., by normalizing the sum of the weighted votes for second capsule j of the second capsule layer as:

$$v_j = \frac{|s_j|^2}{1 + |s_j|^2} \frac{s_j}{|s_j|},$$

where $|s_j|$ is a norm (e.g., a Euclidean norm) of the sum of the weighted votes for capsule j.

The system determines routing factors for the next iteration of the dynamic routing algorithm (406). For each second capsule of the second capsule layer and each first capsule of the first capsule layer in the receptive field of the second capsule, the system determines a similarity measure between the sum of the weighted votes for the second capsule and the vote for the second capsule from the first capsule. In some implementations, the system determines the similarity measure between the sum of the weighted votes for the second capsules and the vote for the second capsule from the first capsule by computing the inner product between them.

Next, the system determines the routing factor between the first capsule and the second capsule for the next iteration by combining the determined similarity measure with the routing factor between the first capsule and the second capsule for the current iteration. For example, the system may determine the routing factor for the next iteration between the first capsule i of the first capsule layer and the second capsule j of the second capsule layer as:

$$r_{ij}^{t+1} = r_{ij}^t + V_{j|i} \cdot v_j,$$

where $r_{ij}^{t+1}$ is the routing factor between capsule i of the first capsule layer and capsule j of the second capsule layer for the next iteration, $r_{ij}^t$ is the routing factor between the capsules for the current iteration, $v_j$ is the normalized sum of weighted votes for second capsule j (as described previously), · indicates the inner product operation, and $V_{j|i}$ is the vote of capsule i of the first capsule layer for capsule j of the second capsule layer.

The system determines whether the current iteration is the final iteration of the dynamic routing algorithm (408). In some implementations, the system may determine that the current iteration is the final iteration if the current iteration is the last iteration of a pre-determined number of iterations. In some implementations, the system may determine that the current iteration is the final iteration if the values of the routing factors between capsules of the first capsule layer and capsules of the second capsule layer determined for the current iteration are sufficiently similar to the values of the routing factors determined for the previous iteration (e.g., have an average difference that is less than a predetermined threshold).

In response to determining that the current iteration is not the final iteration, the system returns to 401 and repeats the preceding steps. In response to determining that the current iteration is the final iteration, the system determines values of final routing factors (410). In some implementations, the system determines the values of final routing factors to be the normalized values of the routing factors determined in the final iteration of the dynamic routing algorithm (where the routing factor normalization can be performed as described above).

Figure 5:
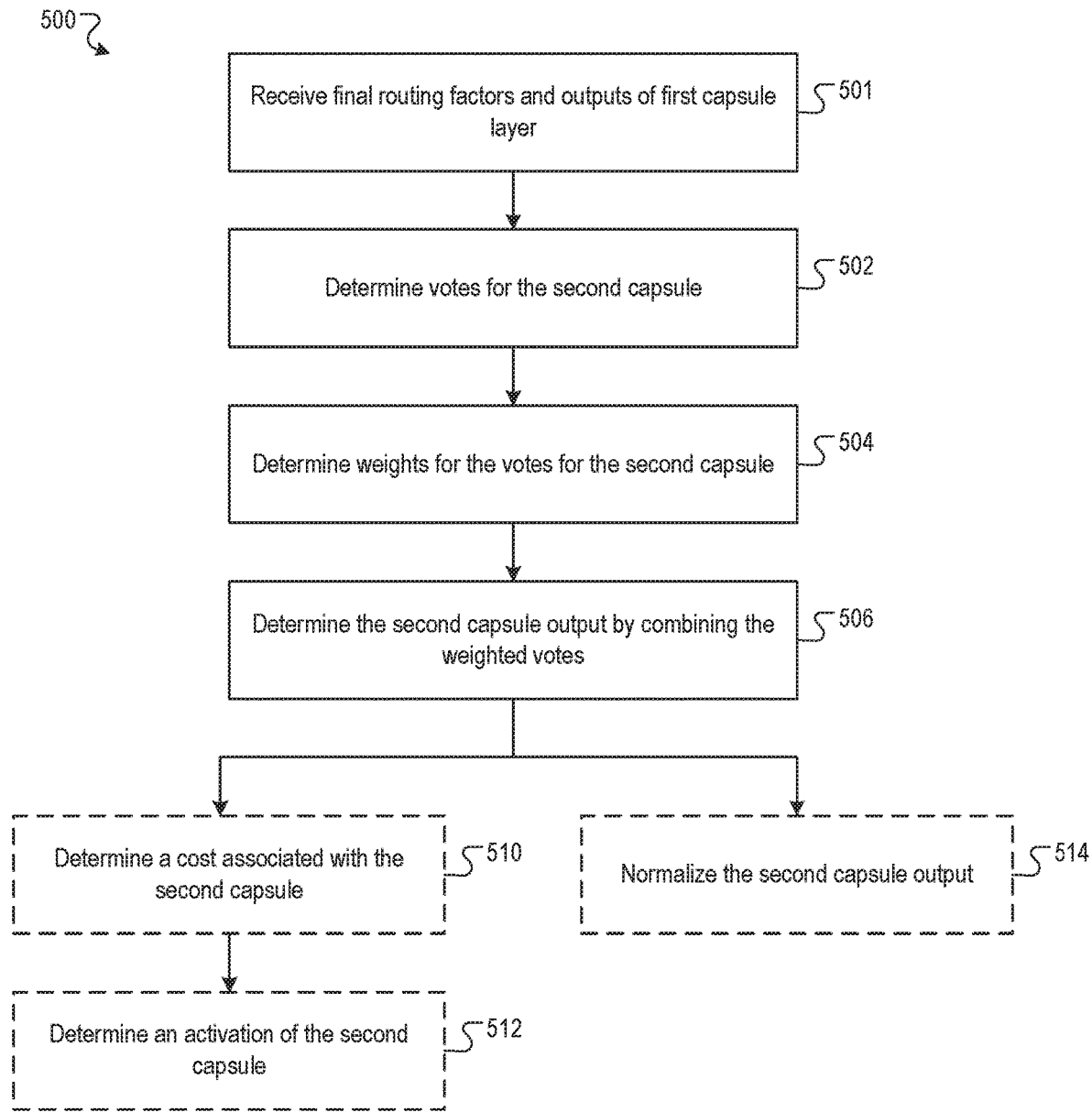
FIG. 5 is an example process for determining a capsule output and a capsule activation.

FIG. 5 is a flow diagram of an example process for determining a capsule output and a capsule activation. Specifically, FIG. 5 describes an example process for a second capsule of a second capsule layer that receives outputs of a first capsule layer (that is before the second capsule layer) to determine a second capsule output and a second capsule activation. For convenience, the process 500 will be described as being performed by a system of one or more computers located in one or more locations. For example, a capsule of a capsule neural network, e.g., the capsule neural network 100 of FIG. 1A, appropriately programmed in accordance with this specification, can perform the process 500.

The second capsule receives final routing factors from the routing system and outputs of capsules in a first capsule layer that is before the second capsule layer (501). The second capsule receives final routing factors between first capsules of the first capsule layer (in the receptive field of the second capsule) and the second capsule. An example process for a routing system to determine final routing factors between a first capsule layer and a second capsule layer using an expectation-maximization routing algorithm is described with reference to FIG. 3A. An example process for a routing system to determine final routing factors between a first capsule layer and a second capsule layer using a dynamic routing algorithm is described with reference to FIG. 4. The second capsule receives outputs of first capsules of the first capsule layer in the receptive field of the second capsule in the first capsule layer.

The second capsule determines a respective vote for the second capsule from each first capsule of the first capsule layer in the receptive field of the second capsule (502). The second capsule has a respective weight matrix corresponding to each first capsule of the first capsule layer in the receptive field of the second capsule. To determine a vote for the second capsule from a particular first capsule, the second capsule multiplies the output of the particular first capsule by the weight matrix of the second capsule that corresponds to the particular first capsule. In some implementations, the output of the particular first capsule is a vector. In these implementations, the weight matrix of the second capsule corresponding to the particular first capsule is a matrix with at least two rows and a number of columns that is the same as the dimensionality of the output of the particular first capsule. In some implementations, the output of the particular first capsule is a matrix. In these implementations, the weight matrix of the second capsule corresponding to the particular first capsule is a matrix with at least two rows and a number of columns that is the same as the number of rows of the output of the particular first capsule.

In some implementations, when the first capsule layer and the second capsule layer are both convolutional capsule layers, the weight matrices of capsules of a second type in the second capsule layer corresponding to capsules of a first type in the first capsule layer are all shared (i.e., the weight matrices are the same). In some of these implementations, the system adds the coordinates of the center of the receptive field of the particular first capsule in the input image to the vote for the second capsule from the particular first capsule. In some implementations, the coordinates of the center of the receptive field of the first capsule are given by the x-y coordinates (in the frame of reference of the input image) of a pixel that is determined to be the center (e.g., the centroid) of the set of pixels of the input image that are in the receptive field of the first capsule. In some implementations, the coordinates of the center of the receptive field of the particular first capsule may be scaled (e.g., such that each coordinate is in the range 0 to 1). In some implementations, when the vote for the second capsule from the particular first capsule is a matrix, the system adds the coordinates of the center of the receptive field of the particular first capsule to the first two components of the rightmost column of the vote for the second capsule from the particular first capsule (e.g., the x-coordinate of the center of the receptive field may be added to the first component of the rightmost column of the vote and the y-coordinate may be added to the second component of the rightmost column of the vote).

The second capsule determines weights for the votes for the second capsule (504). In some implementations, the second capsule determines the weight for a vote for the second capsule from a first capsule of the first capsule layer based on the value of the final routing factor between the first capsule and the second capsule. In some of these implementations, the second capsule determines the weight for a vote for the second capsule from the first capsule of the first capsule layer additionally based on an activation of the first capsule of the first capsule layer.

The second capsule determines the second capsule output by combining the weighted votes for the second capsule (506). In some implementations, the routing system is an expectation-maximization routing system (e.g., the expectation-maximization routing system described with reference to FIG. 3A), and the second capsule determines the second capsule output as a mean of the weighted votes for the second capsule, as described with reference to 308. In some other implementations, the routing system is a dynamic routing system (e.g., the dynamic routing system described with reference to FIG. 4), and the second capsule determines the second capsule output as a sum of the weighted votes for the second capsule, as described with reference to 402.

In some implementations, the routing system is an expectation-maximization routing system (e.g., the expectation-maximization routing system described with reference to FIG. 3A), and the second capsule determines parameters characterizing the distribution of weighted votes for the second capsule and a cost associated with the second capsule (510), as described with reference to 308 and 310. In some of these implementations, the second capsule determines an activation of the second capsule (512), as described with reference to 312.

In some other implementations, the routing system is a dynamic routing system (e.g., the dynamic routing system described with reference to FIG. 4), and the second capsule normalizes the output of the second capsule (514), as described with reference to 404.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A system comprising one or more computers and one or more storage devices storing instructions that when executed by the one or more computers cause the one or more computers to implement:
   a neural network that is configured to receive a network input and to generate a network output for the network input, wherein:
      the neural network comprises a plurality of layers arranged in a sequence, including a plurality of capsule layers;
      each capsule layer comprises a respective plurality of capsules; and
      each particular capsule in a particular capsule layer is configured to:
         receive respective inputs including: (i) outputs generated by capsules of a previous capsule layer that is before the particular capsule layer in the sequence, and (ii) final routing factors between capsules of the previous capsule layer and the particular capsule, wherein the final routing factors are generated by a routing subsystem; and
determine a particular capsule output based on the received inputs, wherein the particular capsule output is of dimension greater than one; and
a routing subsystem that is configured to perform operations including:
receiving outputs generated by capsules in a first capsule layer;
determining final routing factors between capsules of the first capsule layer and capsules of a second capsule layer that is after the first capsule layer in the sequence; and
providing the final routing factors to the capsules in the second capsule layer.

2. The system of claim 1, wherein determining final routing factors between capsules of the first capsule layer and capsules of a second capsule layer that is after the first capsule layer in the sequence comprises:
performing one or more iterations of an expectation-maximization routing algorithm, wherein each iteration of the expectation-maximization routing algorithm includes an M-step and an E-step, wherein for a particular iteration:
the M-step includes, for each second capsule in the second capsule layer:
determining weighted votes for the second capsule from one or more first capsules of the first capsule layer for the particular iteration, comprising:
determining a vote for the second capsule from a particular first capsule of the first capsule layer by multiplying an output of the particular first capsule by a weight matrix of the second capsule that is associated with the particular first capsule;
weighting the vote for the second capsule from the particular first capsule of the first capsule layer by a routing factor between the particular first capsule and the second capsule for the particular iteration;
determining values of one or more parameters characterizing a distribution of weighted votes for the second capsule from the one or more first capsules of the first capsule layer for the particular iteration;
determining a cost associated with the second capsule for the particular iteration based at least in part on the values of the parameters characterizing the distribution of weighted votes for the second capsule for the particular iteration;
determining an activation of the second capsule for the particular iteration based at least in part on the cost associated with the second capsule for the particular iteration; and
the E-step includes determining routing factors for a next iteration based on at least the activations of the capsules of the second capsule layer for the particular iteration and the values of the parameters characterizing the distributions of weighted votes associated with the capsules of the second capsule layer for the particular iteration;
determining final routing factors to be the routing factors determined in a last iteration of the expectation-maximization routing algorithm.

3. The system of claim 2, wherein weighting the vote for the second capsule from the particular first capsule of the first capsule layer further comprises:
weighting the vote for the second capsule from the particular first capsule by an activation of the particular first capsule.

4. The system of claim 2, wherein the cost associated with the second capsule for the particular iteration is further determined based at least in part on the routing factors between the first capsules of the first capsule layer and the second capsule for the particular iteration.

5. The system of claim 2, wherein the cost associated with the second capsule for the particular iteration is further determined based at least in part on an inverse temperature parameter.

6. The system of claim 2, wherein the parameters characterizing the distribution of weighted votes for the second capsule for the particular iteration include:
a mean of the weighted votes for the second capsule from the one or more first capsules of the first capsule layer for the particular iteration; and
a variance of the weighted votes for the second capsule from the one or more first capsules of the first capsule layer for the particular iteration.

7. The system of claim 2, wherein determining a particular capsule output based on the received inputs comprises:
determining weighted votes for the particular capsule from the capsules of the previous capsule layer, comprising:
determining a vote for the particular capsule from a given capsule in the previous capsule layer by multiplying the output of the given capsule by a weight matrix of the particular capsule that is associated with the given capsule;
weighting the vote for the particular capsule from the given capsule in the previous capsule layer by a final routing factor between the given capsule and the particular capsule;
determining the particular capsule output by combining the weighted votes for the particular capsule from the capsules of the previous capsule layer.

8. The system of claim 7, wherein the final routing factors are normalized.

9. The system of claim 7, wherein weighting the vote for the particular capsule from the given capsule in the previous capsule layer further comprises:
weighting the vote for the particular capsule from the given capsule by an activation of the given first capsule.

10. The system of claim 7, wherein combining the weighted votes for the particular capsule from the capsules of the previous capsule layer comprises:
determining a mean of the weighted votes for the particular capsule from the capsules of the previous capsule layer.

11. The system of claim 7, wherein determining a particular capsule output based on the received inputs further comprises:
determining values of one or more parameters characterizing a distribution of the weighted votes for the particular capsule from the capsules of the previous capsule layer;
determining a cost associated with the particular capsule based at least in part on the values of the parameters characterizing the distribution of the weighted votes for the particular capsule;
determining an activation of the particular capsule based at least in part on the cost associated with the particular capsule.

12. The system of claim 1, wherein determining final routing factors between capsules of the first capsule layer and capsules of a second capsule layer that is after the first capsule layer in the sequence comprises:
  performing one or more iterations of a dynamic routing algorithm, wherein a particular iteration of the dynamic routing algorithm includes:
    for each second capsule of the second capsule layer:
      determining weighted votes for the second capsule from one or more first capsules of the first capsule layer for the particular iteration, comprising:
        determining a vote for the second capsule from a particular first capsule of the first capsule layer by multiplying the output of the particular first capsule by a weight matrix of the second capsule that is associated with the particular first capsule;
        weighting the vote for the second capsule from the particular first capsule of the first capsule layer by a normalized routing factor between the particular first capsule and the second capsule for the particular iteration;
      determining routing factors for a next iteration, wherein determining a routing factor between a first capsule of the first capsule layer and a second capsule of the second capsule layer for the next iteration comprises:
        determining a sum of the weighted votes for the second capsule from the one or more first capsules of the first capsule layer for the particular iteration;
        determining a similarity measure between the sum of the weighted votes for the second capsule for the particular iteration and the vote for the second capsule from the first capsule;
        determining the routing factor between the first capsule and the second capsule for the next iteration by combining the determined similarity measure with the routing factor between the first capsule and the second capsule for the particular iteration;
    determining final routing factors to be the routing factors determined in a last iteration of the dynamic routing algorithm.

13. The system of claim 12, wherein determining the sum of the weighted votes for the second capsule further comprises normalizing the sum of the weighted votes for the second capsule.

14. The system of claim 12, wherein the similarity measure between the sum of the weighted votes for the second capsule and the vote for the second capsule from the first capsule comprises:
  the inner product of the sum of the weighted votes for the second capsule and the vote for the second capsule from the first capsule.

15. The system of claim 1, wherein the output of a capsule comprises an activity vector.

16. The system of claim 1, wherein the output of a capsule comprises an activity matrix.

17. The system of claim 1, wherein the neural network comprises an initial convolutional layer followed by a primary capsule layer.

18. The system of claim 17, wherein the primary capsule layer is followed by a plurality of convolutional capsule layers.

19. The system of claim 18, wherein a last convolutional capsule layer of the plurality of convolutional capsule layers is followed by a class capsule layer.

20. The system of claim 19, wherein:
  for each capsule of the class capsule layer, weight matrices of the capsule that are associated with capsules of the last convolutional capsule layer of a same type share weight values, wherein:
    a first capsule of a convolutional capsule layer is of a same type as a second capsule of the convolutional capsule layer if weight matrices of the first capsule share weight values with weight matrices of the second capsule;
  values based on the coordinates of the center of the receptive fields of capsules of the last convolutional capsule layer are added to votes of capsules of the last convolutional capsule layer.

21. The system of claim 19, wherein the neural network is configured to receive a network input and to classify the network input as belonging to one or more of a predetermined set of classes, and wherein the class capsule layer includes a respective capsule for each class in the predetermined set.

22. The system of claim 21, wherein:
  an activation of a respective capsule of the class capsule layer is greater than activations of other capsules of the class capsule layer;
  the network input is classified as belonging to a particular class corresponding to the respective capsule of the class capsule layer.

23. The system of claim 1, wherein the network input is an image.

24. One or more non-transitory computer storage media storing instructions that when executed by one or more computers cause the one or more computers to implement:
  a neural network that is configured to receive a network input and to generate a network output for the network input, wherein:
    the neural network comprises a plurality of layers arranged in a sequence, including a plurality of capsule layers;
    each capsule layer comprises a respective plurality of capsules; and
    each particular capsule in a particular capsule layer is configured to:
      receive respective inputs including: (i) outputs generated by capsules of a previous capsule layer that is before the particular capsule layer in the sequence, and (ii) final routing factors between capsules of the previous capsule layer and the particular capsule, wherein the final routing factors are generated by a routing subsystem; and
      determine a particular capsule output based on the received inputs, wherein the particular capsule output is of dimension greater than one; and
  a routing subsystem that is configured to perform operations including:
    receiving outputs generated by capsules in a first capsule layer;
    determining final routing factors between capsules of the first capsule layer and capsules of a second capsule layer that is after the first capsule layer in the sequence; and
    providing the final routing factors to the capsules in the second capsule layer.

25. A method performed by one or more data processing apparatus, the method comprising:
  receiving a network input; and
  processing the network input using a neural network and a routing subsystem, wherein:
    the neural network is configured to receive the network input and to generate a network output for the network input, wherein:

the neural network comprises a plurality of layers arranged in a sequence, including a plurality of capsule layers;

each capsule layer comprises a respective plurality of capsules; and each particular capsule in a particular capsule layer is configured to:

receive respective inputs including: (i) outputs generated by capsules of a previous capsule layer that is before the particular capsule layer in the sequence, and (ii) final routing factors between capsules of the previous capsule layer and the particular capsule, wherein the final routing factors are generated by a routing subsystem; and determine a particular capsule output based on the received inputs, wherein the particular capsule output is of dimension greater than one; and the routing subsystem is configured to perform operations including:

receiving outputs generated by capsules in a first capsule layer;

determining final routing factors between capsules of the first capsule layer and capsules of a second capsule layer that is after the first capsule layer in the sequence; and providing the final routing factors to the capsules in the second capsule layer.

\* \* \* \* \*